Dec. 30, 1969　　　　　M. F. GIFT　　　　3,487,274
CONTROLLED RECTIFIER DEVICE WITH INTEGRAL
di/dt LIMITING REACTOR
Filed March 20, 1968

INVENTOR.
MYRVEN F. GIFT

BY

Ostrolenk, Faber, Gerb & Soffen
ATTORNEYS

United States Patent Office 3,487,274
Patented Dec. 30, 1969

3,487,274
CONTROLLED RECTIFIER DEVICE WITH INTEGRAL $di/dt$ LIMITING REACTOR
Myrven F. Gift, Palos Verdes Estates, Calif., assignor to International Rectifier Corporation, Los Angeles, Calif., a corporation of California
Filed Mar. 20, 1968, Ser. No. 714,685
Int. Cl. H01l *3/12*
U.S. Cl. 317—234   6 Claims

ABSTRACT OF THE DISCLOSURE

A saturable reactor core is built into the housing or lead of a controlled rectifier to delay rise of current until the device is conductive over a large portion of its active area.

---

This invention relates to controlled rectifiers, and more particularly relates to a controlled rectifier device having a built-in saturable reactor for limiting rate-of-rise-of-current through the device after firing.

In accordance with the present invention, a magnetic core of saturable-type material is contained integrally with the device housing, as by directly encircling the internal cathode lead or is contained in the outer hermetic sealing housing, again encircling the housing. Alternatively, small, spaced cores can encircle the cathode lead, their spacing permitting the lead to be flexible. When the device is now turned on, the cathode current will rise normally until reaching the magnetizing current of the core or cores. Thereafter, the current will be held relatively constant until the core or cores are saturated, thus providing a "step" in the current rise waveform which delays rise of current while the controlled rectifier becomes conductive to over nearly its full area.

Accordingly, a primary object of this invention is to provide a controlled rectifier device with built-in limitation on rate-of-rise-of-current regardless of the nature of the circuit receiving the device.

Another object of this invention is to build saturable-type reactor material into the housing of a controlled rectifier.

These and other objects of this invention will become apparent from the following description when taken in connection with the drawings, in which.

Figure 2:
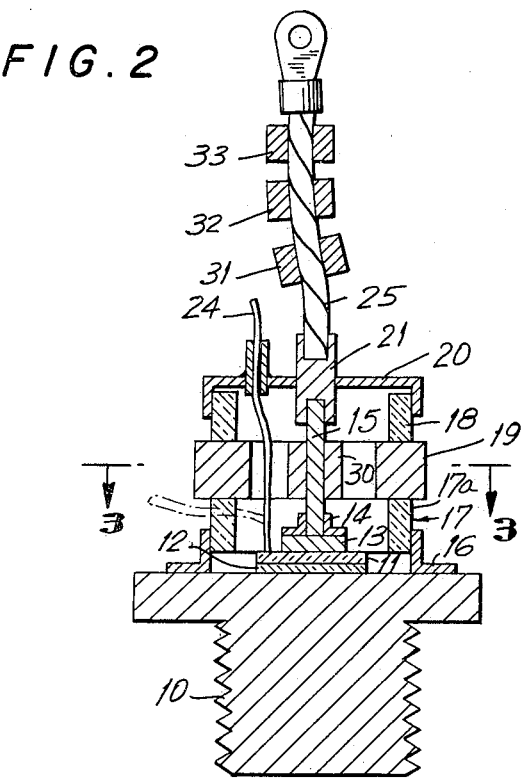
FIGURE 2 is a cross-sectional view through a controlled rectifier showing the use of reactor elements in various housing portions thereof.
Figure 3:
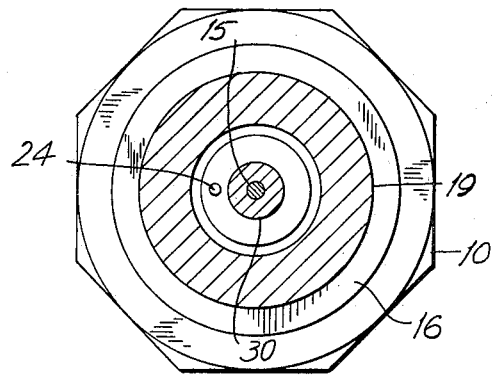
FIGURE 3 is a cross-sectional view of FIGURE 2 taken across section line 3—3 in FIGURE 2.

Referring to the drawings, FIGURES 2 and 3 show a controlled rectifier comprised of a standard threaded stud 10 which has a controlled rectifier element mounted thereon comprised of a silicon wafer 11, mounted between molybdenum plates 12 and 13. Plate 12 is suitably connected to the anode of the device and plate 13 is connected to the cathode thereof. Obviously, the invention could also apply to reverse polarity devices.

A standard lead receiving ring 14 is connected to plate 13 and receives the bottom of flexible conductor 15. A ring 16 secured to stud 10 receives the bottom of insulation ring 17, which could be a standard ceramic ring, or, as shown in FIGURE 2 and in accordance with the invention, can be a three-part structure consisting of ceramic sections 17a and 18 with an interposed magnetic core 19 built directly into the insulation housing. A top cap 20 is then provided which receives a lead adapter 21 and insulation lead 22 which carries a lead tube 23 for passing gate lead 24 of device 11. It would be useful in many applications to have the gate lead free of the magnetic circuit of core 19. In such cases, lead 24 can be taken out through the side of ceramic sections 17a, as shown in dotted lines in FIGURE 2.

The upper end of lead 15 is secured to the interior of adapter 21 and an external pigtail lead 25 is connected to the top of adapter 21.

The foregoing structure is completely standard, except for core 19, and forms a hermetically sealed enclosure for wafer 11.

In accordance with the invention, one or more cores of saturable-type magnetic material is built into the device. For example, core 19 may be built into the ceramic insulation housing. In a similar manner, a core 30 could be secured, as by cementing, to lead 15. In addition, cores 31, 32 and 33 may be secured to lead 25, the cores spaced from one another so that the lead may be flexed. The foregoing core arrangements could be used singly or together with one another. Note that where only cores 30 to 33 are used (and core 19 is excluded), the gate 24 can come out of the housing through top cap 20 in the usual manner without being affected by the magnetic circuit.

Figure 1:
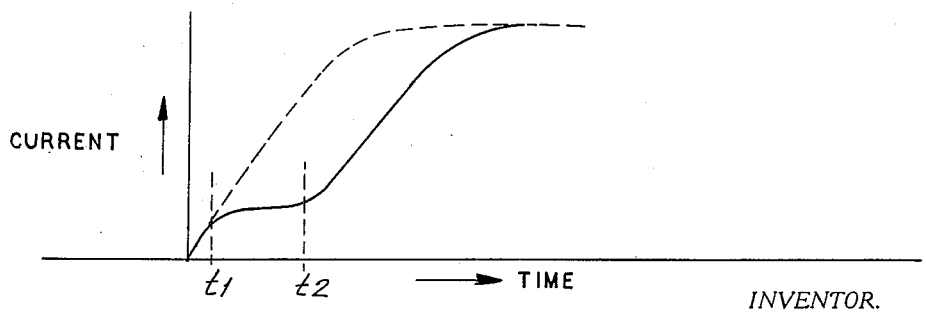
FIGURE 1 shows the change in current as a function of time for the device having saturable reactor current rise delay apparatus therein.

The various cores would operate, as shown in FIGURE 1, to cause a "step" or delay between times $t_1$ and $t_2$ during the rise of current, shown in solid lines in FIGURE 1, following firing of the device. Thus, the current will not rise along its normal dotted line path, thus giving device 11 sufficient time to become nearly fully conductive before high currents are encountered. In the design of such cores, their cross-sectional area need only be large enough to cause a step of about three microseconds, since the rate of increase of conduction area is the greatest at the beginning of the turn-on process, and a short delay at this critical time will greatly enhance the $di/dt$ capability of the device.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. In a controlled rectifier device comprising a semiconductor wafer having first and second electrodes on opposite surfaces thereof and a gate lead extending from one of said surfaces receiving said first electrode; a conductive stud receiving said second electrode; a lead extending from said first electrode; and a hermetically sealed housing enclosing said wafer and said lead and secured to said stud; the improvement which comprises a saturable reactor magnetic core encircling said lead at least one portion of said core being within said hermetically sealed housing.

2. The device as set forth in claim 1 wherein said core is connected directly to said lead within said housing.

3. The device as set forth in claim 1 wherein said housing includes a hollow cylindrical member surrounding said lead; said core forming at least a portion of the wall of said hollow cylindrical member.

4. The device as set forth in claim 1 which further includes a flexible lead connected to said lead and external of said hermetically sealed housing; and a plurality of cores of magnetic material mounted on said external flexible lead in axially spaced relation with respect to one another.

5. The device as set forth in claim 1 wherein said core has a cross-sectional area designed to provide a current step having a duration of about three microseconds.

6. The device as set forth in claim 2 wherein said housing includes a hollow cylindrical member surrounding said lead; said core forming at least a portion of the wall of said hollow cylindrical member.

References Cited

UNITED STATES PATENTS 2,975,343   3/1961   Scharli _____ 317—234

JAMES D. KALLAM, Primary Examiner

R. F. POLISSACK, Assistant Examiner

U.S. Cl. X.R.

317—20, 235; 321—11